(12) United States Patent  
Isherwood et al.

(10) Patent No.: US 9,075,724 B2  
(45) Date of Patent: *Jul. 7, 2015

(54) METHOD AND APPARATUS FOR ENSURING DATA CACHE COHERENCY

(75) Inventors: Robert Graham Isherwood, Buckinghamshire (GB); Yin Nam Ko, London (GB)

(73) Assignee: Imagination Technologies Limited, Kings Langley (GB)

( * ) Notice: Subject to any disclaimer, the term of this patent is extended or adjusted under 35 U.S.C. 154(b) by 179 days.

This patent is subject to a terminal disclaimer.

(21) Appl. No.: 13/555,894

(22) Filed: Jul. 23, 2012

(65) Prior Publication Data

US 2013/0219145 A1 Aug. 22, 2013

Related U.S. Application Data

(63) Continuation of application No. 12/586,649, filed on Sep. 25, 2009, now Pat. No. 8,234,455.

(30) Foreign Application Priority Data

Apr. 7, 2009 (GB) .................................. 0906066.6

(51) Int. Cl.
  *G06F 12/00* (2006.01)
  *G06F 12/08* (2006.01)
  *G06F 9/45* (2006.01)
  *G06F 9/52* (2006.01)

(52) U.S. Cl.
  CPC ............ *G06F 12/0828* (2013.01); *G06F 9/522* (2013.01); *G06F 8/458* (2013.01); *G06F 8/433* (2013.01); *G06F 12/0842* (2013.01); *G06F 12/0859* (2013.01)

(58) Field of Classification Search
  None
  See application file for complete search history.

(56) References Cited

U.S. PATENT DOCUMENTS

| | | | |
|---|---|---|---|
| 6,915,395 B1* | 7/2005 | Singh | 711/154 |
| 7,073,031 B1* | 7/2006 | MacLellan et al. | 711/141 |
| 7,343,477 B1* | 3/2008 | Thatipelli et al. | 712/218 |
| 2004/0044881 A1* | 3/2004 | Maier et al. | 712/218 |
| 2005/0044128 A1* | 2/2005 | Scott et al. | 709/200 |
| 2005/0216705 A1* | 9/2005 | Shibayama et al. | 712/216 |
| 2009/0044194 A1* | 2/2009 | Rathi | 718/104 |
| 2009/0235254 A1* | 9/2009 | Michael | 718/101 |
| 2010/0058034 A1* | 3/2010 | Zaks | 712/216 |
| 2010/0250802 A1* | 9/2010 | Waugh et al. | 710/100 |
| 2010/0293347 A1* | 11/2010 | Luttrell | 711/156 |

FOREIGN PATENT DOCUMENTS

GB 2447907 A * 10/2008 ............... G06F 9/38

* cited by examiner

*Primary Examiner* — Kaushikkumar Patel
(74) *Attorney, Agent, or Firm* — Vorys, Sater, Seymour and Pease LLP; Vincent M DeLuca; Michael S. Garrabrants

(57) ABSTRACT

A multithreaded processor can concurrently execute a plurality of threads in a processor core. The threads can access a shared main memory through a memory interface; the threads can generate read and write transactions that cause shared main memory access. An incoherency detection module prevents incoherency by maintaining a record of outstanding global writes, and detecting a conflicting global read. A barrier is sequenced with the conflicting global write. The conflicting global read is allowed to proceed after the sequence of the conflicting global write and the barrier are cleared. The sequence can be maintained by a separate queue for each thread of the plurality.

18 Claims, 8 Drawing Sheets

| | |
|---|---|
| T0 writes to A with data 0x10 | Since A is not in the cache, the write is issued to the memory bus and would take an undefined amount of time to reach the memory bus. The write is not written to the cache. |
| T1 reads B | Since B is not in the cache, data cache MMU would fetch the cache line containing B from the memory bus, again it would take an undefined amount to reach the memory bus and in this scenario, the T1 cache line reads reach the memory bus before the T0 write (ie re-ordeded) |
| T1 cache line fetch done | The cache line would now contain old value of A from main memory |
| T0 read A | T0 would expect to read the latest value of 0x10 however it would read an old value from the cache line fetched by T1 |

PRIOR ART
FIG. 2a

| | |
|---|---|
| T1 reads B | Since B is not in the cache, data cache MMU would fetch the cache line containing B from the memory bus, again it would take an undefined amount to reach the memory. |
| T0 writes to A with data 0x10 | Since A is not in the cache, the write is issued to the memory bus and would take an undefined amount of time to reach the memory bus. In this scenario, the T1 cache line reads reach the memory bus before the T0 write (ie not re-ordered). The write is not written to the cache. |
| T1 cache line fetch done | The cache line would now contain old value of A from main memory |
| T0 read A | T0 would expect to read the latest value of 0x10 however it would read an old value from the cache line fetched by T1 |

PRIOR ART
FIG. 2b

| Valid | TAG | MU | ML |
|---|---|---|---|
| 0(slot0) | 0x00000000 | 0xFF | 0x000000 |
| 0 | 0x00000000 | 0xFF | 0x000000 |
| 0 | 0x00000000 | 0xFF | 0x000000 |
| 0(slot3) | 0x00000000 | 0xFF | 0x000000 |

FIG. 4a

| Valid | TAG | MU | ML |
|---|---|---|---|
| 1 | 0xB1000000 | 0xFF | 0xFFFFFF |
| 0 | 0x00000000 | 0xFF | 0x000000 |
| 0 | 0x00000000 | 0xFF | 0x000000 |
| 0 | 0x00000000 | 0xFF | 0x000000 |

FIG. 4b

| Valid | TAG | MU | ML |
|---|---|---|---|
| 1 | 0xB1000000 | 0xFF | 0xFFFFFF |
| 1 | 0xA0000000 | 0xFF | 0xFFFFFF |
| 0 | 0x00000000 | 0xFF | 0x000000 |
| 0 | 0x00000000 | 0xFF | 0x000000 |

FIG. 4c

| Valid | TAG | MU | ML |
|---|---|---|---|
| 1 | 0xB1000000 | 0xFF | 0xFFFFF8 |
| 1 | 0xA0000000 | 0xFF | 0xFFFFFF |
| 0 | 0x00000000 | 0xFF | 0x000000 |
| 0 | 0x00000000 | 0xFF | 0x000000 |

FIG. 4d

| Valid | TAG | MU | ML |
|---|---|---|---|
| 1 | 0xB1000000 | 0xFF | 0xFFFFF8 |
| 1 | 0xA0000000 | 0xFF | 0xFFFFFF |
| 1 | 0x80000000 | 0xFF | 0xFFFFFF |
| 0 | 0x00000000 | 0xFF | 0x000000 |

FIG. 4e

| Valid | TAG | MU | ML |
|---|---|---|---|
| 1 | 0xB1000000 | 0xFF | 0xFFFFF8 |
| 1 | 0xA0000000 | 0xFF | 0xFFFFFF |
| 1 | 0x80000000 | 0xFF | 0xFFFFFF |
| 1 | 0x90000000 | 0xFF | 0xFFFFFF |

FIG. 4f

| Valid | TAG | MU | ML |
|---|---|---|---|
| 1 | 0xC0000000 | 0x80 | 0x000000 |
| 0 | 0xA0000000 | 0xFF | 0xFFFFFF |
| 0 | 0x80000000 | 0xFF | 0xFFFFFF |
| 0 | 0x90000000 | 0xFF | 0xFFFFFF |

METHOD AND APPARATUS FOR ENSURING DATA CACHE COHERENCY

FIELD OF THE INVENTION

The invention relates to multi-threaded processors, and in particular to the problem of data incoherency between a cache memory accessed by multiple threads and the main memory in a multi-threaded processor.

BACKGROUND TO THE INVENTION

A multi-threaded processor is capable of processing multiple different instruction sequences (or threads) simultaneously. During execution of a thread data and instructions need to be accessed from memory. Different threads may therefore need to access memory, and sometimes the same portion of memory, simultaneously. There therefore needs to be some arbitration between threads for memory access.

A multi-threaded processor typically has an instruction cache and a data cache containing the most commonly accessed data and instructions, as shown in FIG. 1. If the required data or instructions are not found in the caches then access to the memory on the memory bus must be requested. Access to the memory has to be controlled to ensure threads do not conflict with each other. For this reason, memory accesses from different threads from the instruction and data caches each have their own dedicated data path up to the memory arbiter module.

FIG. 1 is a schematic illustration of a memory access system in a multi-threaded processor in accordance with the prior art. Threads running on the processor core 10 can request data and instructions from the data and instruction caches 11, 12. The instruction and data caches each have memory management units associated with them. If the requested data or instructions are not in one of the caches, the request is passed to the memory bus. In order to arbitrate between requests from different thread the requests are routed first through a thread arbiter 13, 14, which orders the requests for that thread, and then a memory arbiter 15, which controls access to the memory bus.

Within the main memory, data is typically stored and accessible in units of a fixed number of bits, called cache lines. So, in order to read a memory address from the memory, the entire cache line containing that address must be fetched. There are two types of cache line. One type is a local cache line that only stores data for a particular thread. The other is a global cache line that stores data accessible by different threads. Whether a piece of data is stored within a global or local cache line depends on its linear address. The present invention is concerned with memory resources that are shared between threads, i.e. global cache lines.

A global cache line might store the values of software local variables entered by different threads in different word positions within the cache line. It is expected that when a thread Tx reads its local variable from the cache line it would get back its last written value. However, situations can arise when using write through data caches in which accesses by the other threads to their local variables within the same cache line cause the thread Tx to read an old and wrong value. When this happens Tx is said to have become "data incoherent".

FIGS. 2a and 2b each illustrate an example sequence of accesses by different threads causing data incoherence on thread T0.

Referring to FIG. 2a, T0 first accesses its local variable, A, with a write request. T1 then accesses its local variable, B, with a read request. The physical addresses of A and B are such that they are cached within the same global data cache line. Initially both A and B are not in the cache.

Read requests typically take less time to reach the memory bus than write requests. In this case, the T1 read reaches the memory before the T0 write. As a result, an old value of the cache line is stored in the data cache. The T0 write request does not write to the data cache, only to the memory bus. So, subsequent reads of the cache line from the data cache will fetch the old values that are stored in the data cache as a result of the T1 read.

Referring to FIG. 2b, once again A and B are both in the same cache line, and initially not in the data cache. T1 first accesses B from the memory bus with a read request. Before B is fetched, i.e. between the time the read request leaves the data cache and the time the cache line containing B is stored in the data cache, a write request for A is issued to the memory bus from T0. Again, the write from T0 is not written to the data cache, so the data cache retains an old version of the cache line, which will be accessed by subsequent read requests.

As can be seen, when multiple threads access global cache memory from the memory bus, data incoherency can arise particularly write-through caches. This invention aims to address this problem by detecting the incoherency hazard and using a mechanism to ensure that read or write instructions are only issued out of the memory bus when it is safe to do so.

SUMMARY OF THE INVENTION

The present invention is defined in the appended independent claims. Preferred features are defined in the dependent claims.

BRIEF DESCRIPTION OF THE DRAWINGS

Examples of the present invention will now be described with reference to the accompanying drawings, in which:

FIGS. 2a and 2b each illustrate a sequence of memory accesses resulting in cache incoherency;

FIG. 4 illustrates the operation of an example global write address memory in accordance with the invention

DETAILED DESCRIPTION

As illustrated in FIGS. 2a and 2b, data incoherency can arise as a result of different circumstances, which can be dealt with differently. The incoherency illustrated by FIG. 2a can be avoided using a first mechanism and the incoherency illustrated by FIG. 2b can be avoided using a second mechanism.

Figure 3:
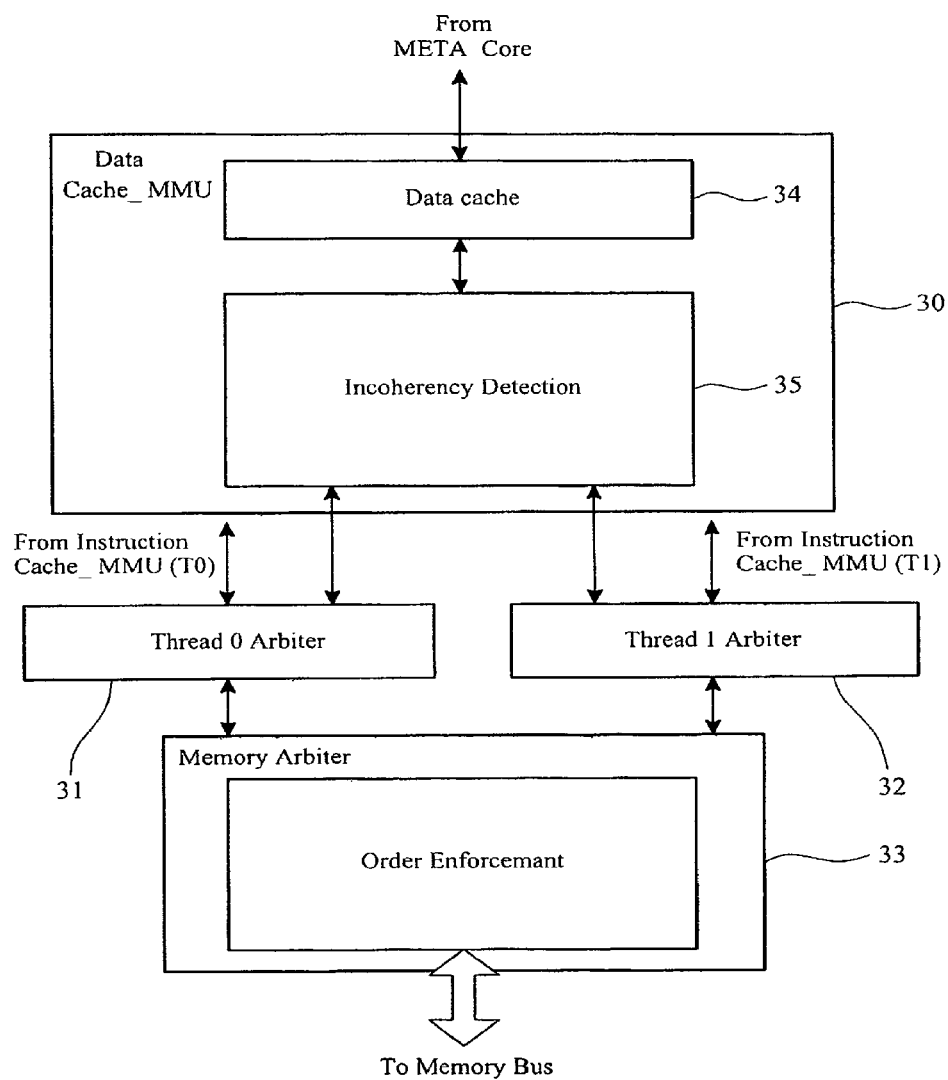
FIG. 3 schematically illustrates a system in accordance with the present invention.

FIG. 3 is a schematic illustration of a system in accordance with a first aspect of the present invention. FIG. 3 illustrates a system for accessing data from the memory bus that avoids the data incoherency that can arise from the situation described with reference to FIG. 2a. As the invention is concerned with data incoherency, and hence access to data, the paths for instruction fetches from the memory bus have been omitted for clarity.

The system comprises a data cache memory management unit 30 connected to the processor core, thread arbiters 31, 32 connected to the memory management unit and a memory arbiter 33 connected between the thread arbiters and a memory bus.

Within the data cache memory management unit is the data cache itself 34 and an associated memory management function for address translation etc., as well as an incoherency detection module.

Figure 1:
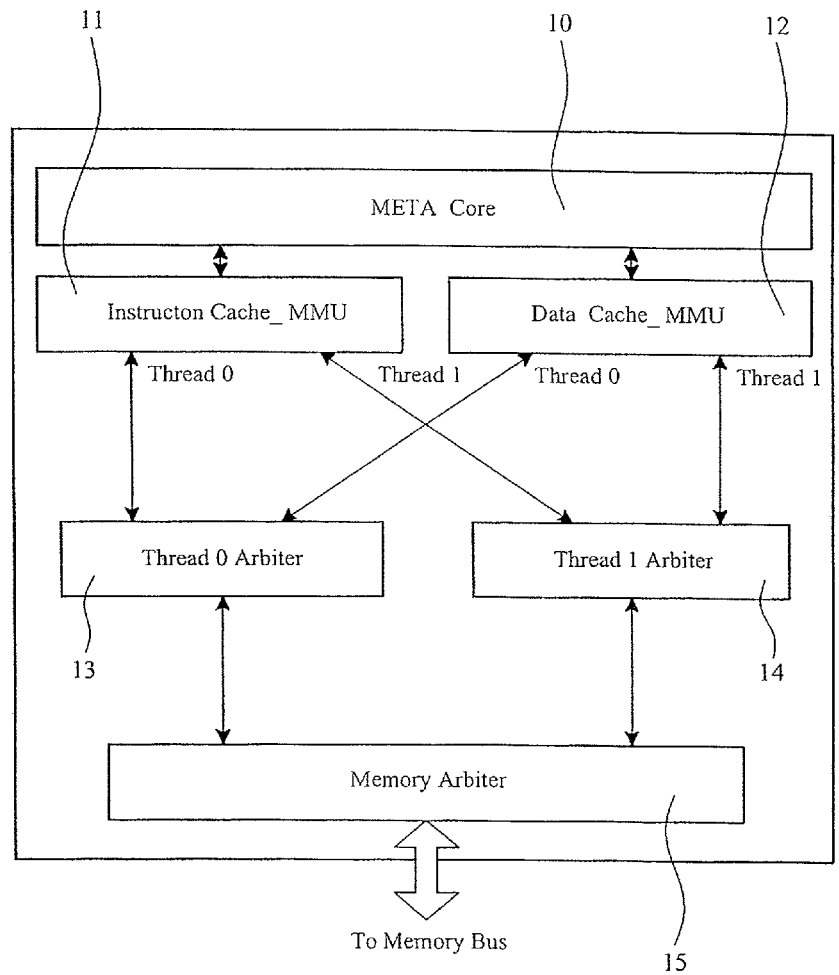
FIG. 1 illustrates the memory access system in a conventional multi-threaded processor core.

As in the system shown in FIG. 1, in the system of FIG. 2, when a thread executing on the processor core issues a read or write request, the request is routed to the data cache MMU 30. For a read request, if the data is in the data cache 34 it is fetched and used immediately. If it is not in the data cache, the memory on the memory bus must be accessed. For a write request in a write-through cache, the write request always accesses the memory bus. The memory management unit (MMU) function associated with the data cache will convert the virtual memory address used by the program running on the processor into a physical memory address on the memory bus.

In one aspect of the invention, an incoherency detection module 35 is provided in order to deal with incoherency resulting from global read requests and global write requests. The terms "global write request" and "global read request" as used herein mean a request to a portion of memory shared by multiple threads. Global read and write requests from the data cache 34 must first pass through the incoherency detection module 35 before reaching the memory arbiter 33 and then the memory bus. An incoherency detection module is illustrated in more detail in FIG. 5.

The incoherency detection module has three functions. One is to maintain a record of the physical addresses of previous global write requests. Another is to compare the address of any incoming global read with the record of previous write requests to decide whether there are past writes to the same global cache line. The last is to use the comparison information to add an 'order enforcement sideband' to each request (or insert separate 'barrier requests') so the memory arbiter 33 can enforce an order for issuing requests to the memory bus as intended by the incoherency detection module 35. This mechanism does not stall or throttle data low through the various modules before the memory arbiter, which would cause performance degradation.

To keep a record of the individual physical addresses of all previous global cache writes would require an infinite amount of memory, which is not practical to implement. An alternative is to compress the individual addresses of global write requests into ranges of addresses instead. In this embodiment, the incoherency detection module includes a Global Write Address Memory (GWAM) for each thread. Each GWAM consists of a small number of data storage slots, each storing a non-overlapping address range.

FIG. 4 illustrates how an example GWAM in accordance with the present invention operates. FIG. 4a shows a GWAM having four memory slots. The memory slots are initially empty. Each memory slot has four fields: a valid flag field, a 32-bit byte address field (TAG), an upper address range size mask (MU) and a lower address range size bit mask (ML).

The valid flag simply indicates whether a recorded write address is within the memory slot. The TAG field indicates an address within the range of memory addresses covered by the slot.

The MU and ML fields define the memory address range covered by the slot. For the address range covered, the lower address=TAG && (MU & ML), where && represents a bit AND operation and & represent vector concatenation. The upper address=TAG || !(MU & ML), where || represents a bit OR operation. For example, using hexadecimal notation, for TAG=0xAAAAAA34, ML=0xFFFF00, MU=0xFF, the Address range=0xAAAAAA00 to 0xAAAAAAFF.

When a first write address is recorded it is assigned to a memory slot in GWAM. This is illustrated in FIG. 4b. Since all the slots are empty prior to this, there is no need to compress the data. So the write address, in this case 0xB1000000, is stored in the first slot with a minimum address range.

When a second write address 0xA0000000 is to be stored in GWAM, it is stored in the second slot, again with minimum range. This is shown in FIG. 4c.

When a third write address is issued that could fall within an address range defined by the MU field of another slot, it is placed in that slot and the ML field altered to accommodate the new address. FIG. 4d illustrates this. In FIG. 4d, the new write request is to address 0xB1000004. As this address can be compacted into the first slot by changing the value of ML (and leaving MU unchanged), it is compacted into the first slot.

FIGS. 4e and 4f illustrate the addition of two more write request addresses, 0x80000000 and 0x90000000 which cannot be compacted into existing slots. After the addition of these addresses, all the slots are being used.

FIG. 4g shows the subsequent addition of a new request address 0xC0000000. As this address cannot be compacted into any slots, and all the slots are full, all of the existing slots are compacted into one range, in the first slot. There are then three slots available for incoming write request addresses.

This GWAM arrangement allows sufficient information about write addresses to be stored in a small memory. It can lead to some barriers being inserted without being necessary, but in practice this compromise does not substantially affect performance.

Figure 5:
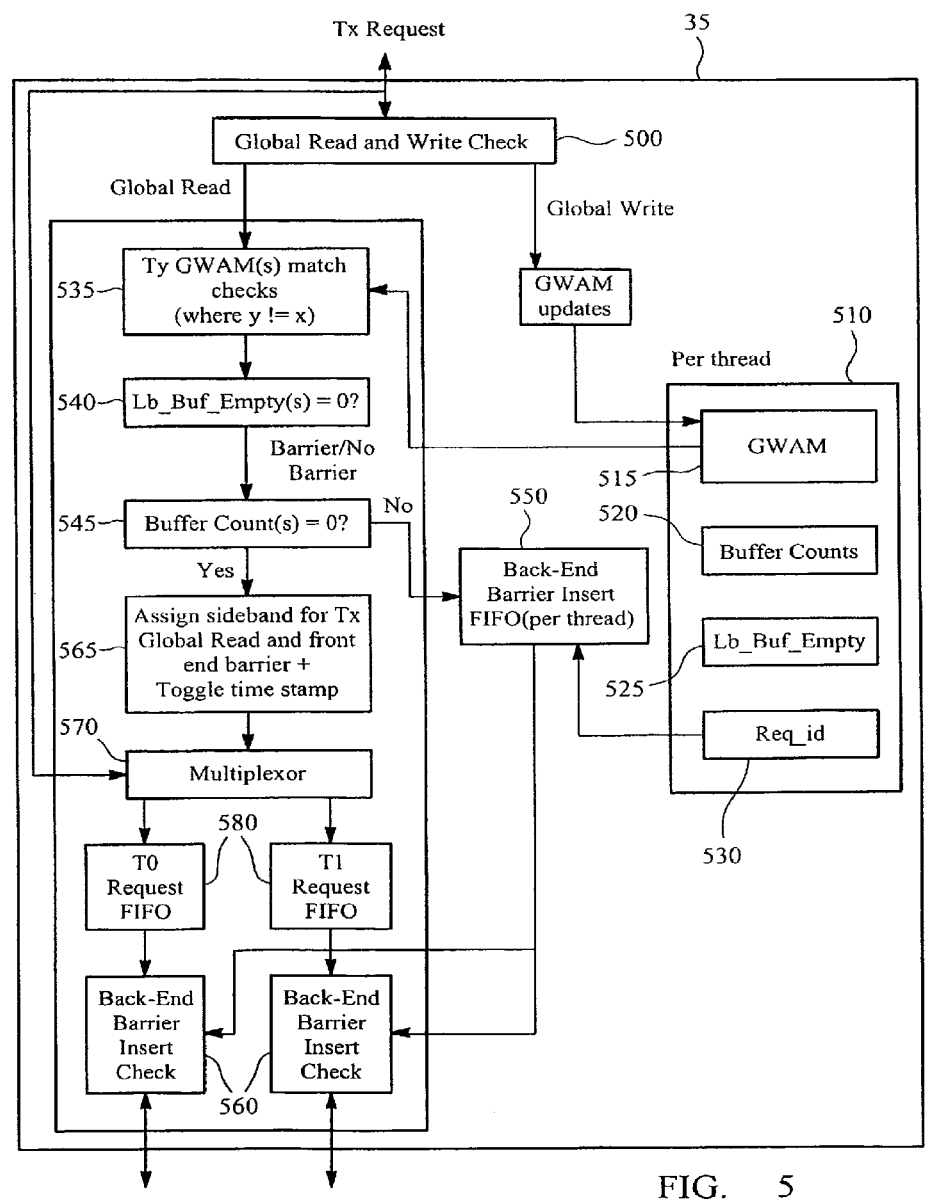
FIG. 5 illustrates an incoherency detection module for use in the system of FIG. 3.

FIG. 5 shows the component parts of the incoherency detection module of FIG. 3. Upon receiving a request from thread Tx the incoherency detection module first determines at block 500 if it is a read request or a write request to a global cache line.

If it is a global write request, the GWAM for thread Tx is updated as described with reference to FIG. 4.

FIG. 5 shows the memory and registers maintained by the incoherency detection module for each thread, in block 510. The GWAM is shown as block 515. Also included is: a buffer count register 520, which is a record of the number of requests queued for that thread in FIFO 580, waiting to be passed to the memory arbiter; a last barrier buffer empty (LB_buff_empty) register 525 that takes a value of 1 or 0 and indicates if any requests have been passed from the data cache for that thread since the last barrier for that thread; and a request ID (req_id) that provides an identification value for each request in FIFO 580.

If it is a global read request from thread Tx, the request is passed to a comparator unit 530. The comparator unit 530 checks to see if the memory address of the global read request falls within an address range in any of the GWAMs of other threads.

If the read request address does not fall within an address range in the GWAM of another thread, then the read request can be passed to the memory arbiter without the insertion of any barrier flags or barrier requests.

However, if the read request address does fall within a stored address range of a GWAM of another thread (which will be referred to as a matching thread herein), the request is passed to block 540, which determines the value of the LB_buff_empty register for each matching thread. If the LB_buff_empty register has a value 0 for a matching thread (i.e. if no requests are queued for that thread since the last barrier was inserted) then no further barrier need be inserted.

However, if the LB_buff_empty register has a value 1 for a matching thread, then a barrier must be inserted for that thread, in order to prevent incoherency problems arising.

There are two ways in which a barrier can be inserted. A barrier can be inserted as sideband data attached to an existing request or it can be inserted as a separate "barrier request" comprising a new request with attached sideband data. If there are requests queued in FIFO 580 for the thread in question, then the barrier is added to the last request in the FIFO as sideband data. If there are no queued requests for that thread in the FIFO 580, then there is nothing to attach the barrier sideband data to. In that case, the barrier must take the form of a new barrier request with attached barrier sideband data. So at block 545, the incoherency detection module determines if the buffer count for each matching thread is equal to 0 or not.

If the buffer count is equal to 0 then the barrier is inserted as a new barrier request. This is indicated at block 565. At the same time, sideband data, referred to as block check data, is added to the read request and a time stamp, which is appended to each request is incremented or toggled. The block check data includes the thread ID of every matching thread for which barriers have been inserted. The requests are then queued in the per-thread FIFOs 580 until they can be issued to the memory arbiter. The term "time-stamp" is used herein to mean a piece of data related to time, which, when changed, marks a new time period. In a preferred embodiment, the time stamp is a one-bit field that can take on a value of 0 or 1.

If the buffer count is not equal to 0 for a matching thread for which a barrier is to be inserted, the barrier is attached as sideband data to the last request in FIFO 580. However, the barrier sideband data cannot be added until after the request has exited FIFO 580. A back-end barrier insert FIFO 550 is therefore provided for each thread. This FIFO 550 stores the thread ID of the request to which the barrier is to be appended, together with the barrier data itself, including the ID of the corresponding global read request.

Following all of the checks described, the read and wile requests for each thread are queued in per thread request FIFOs 580. A multiplex function 570 is shown in FIG. 5 to illustrate that the requests and barriers are routed to the appropriate thread FIFO 580. The arrow from block 565 indicates a barrier request for insertion. The arrow from the top of the Figure indicated the read and write requests that are added into the per-thread FIFOs via the multiplexer 570. So, if a barrier is to be inserted as a separate barrier request it is queued in the correct thread request FIFO, while the corresponding read request is queued in its thread request FIFO.

A back-end barrier insert check stage 560 is provided at the exit of each request FIFO 580. Every request leaving FIFO 580 is checked against the first entry in the corresponding back-end barrier insert FIFO 550. When there is a match, the sideband data is appended to the request before being sent on to the memory arbiter.

When a barrier, either as sideband data or as a separate barrier request, is included in a request queue, the GWAM for that thread is flushed. All entries in the GWAM can be erased as there is no longer any incoherency hazard associated with those memory address entries.

In summary, to support the order enforcement, the incoherency detection module performs the following steps when an incoming read address falls within one of the GWAM address range slots:

1) Issue barrier request for the threads that need one
2) Assign appropriate block check sideband data to the read request
3) Toggle the internal 1-bit time stamp which is attached to every read/write
4) Flush the GWAM of the threads that have barrier requests issued.

Figure 6:
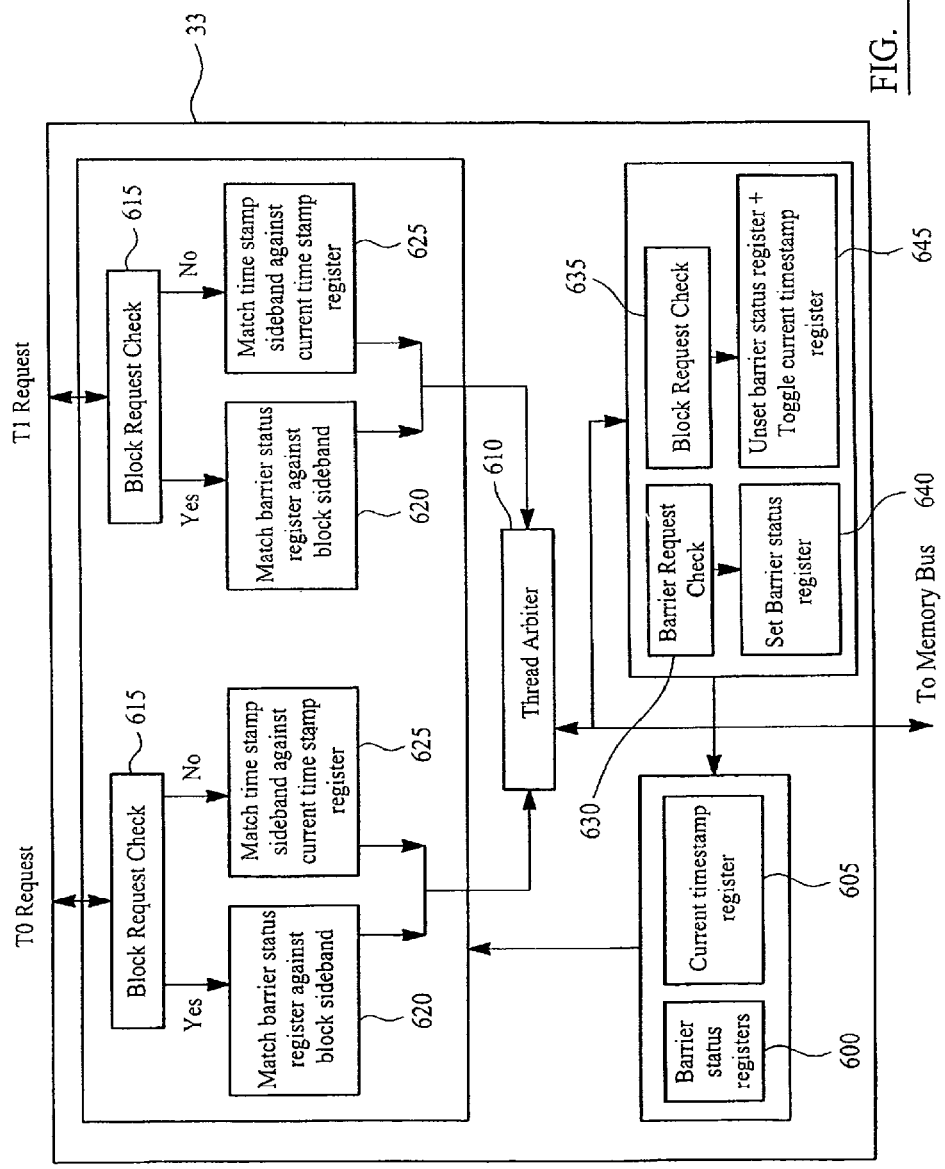
FIG. 6 illustrates a memory arbiter for use in the system of FIG. 3.

FIG. 6 illustrates the functional hardware blocks of an order enforcement memory arbiter in accordance with this embodiment.

The memory arbiter maintains a barrier status register 600 and current time stamp register 605. The barrier status register 600 indicates whether and from which threads barriers have been issued through the thread arbiter 610. The barrier status register is cleared every time the internal time stamp of the memory arbiter is incremented or toggled. The internal time stamp is incremented or toggled every time a read request having block check sideband data is issued by the thread arbiter. The time stamp register is simply a record of the current time stamp value.

It is first determined at block 615 if a request arriving from the incoherency detection module is a global read request with block check sideband data. If it is a global read request with block check sideband data, at block 620 the memory arbiter reads the barrier data in the block check sideband data and checks it against the barrier status register to determine if the associated barriers have all been issued by the thread arbiter 610. If all the associated barriers have been issued, the global read request is released to the thread arbiter. If not all associated barriers have been issued by the thread arbiter, the global read request is blocked at the input of the memory arbiter. These checks are repeated until the global read request can be released.

If the request is not a global read request, with block check sideband data at block 625 its time stamp is compared with the internal time stamp value stored in the current time stamp register. If the time stamps match, the request is released to the thread arbiter. If the time stamps do not match, the request is blocked. This time stamp check is repeated until the time stamps match and the request is released.

The thread arbiter 610 receives released requests for all threads and uses an arbitration technique, such as a round robin technique, to arbitrate between threads for access to the memory bus. Any desired metric may be used in the thread arbiter to arbitrate between threads.

When requests including barriers, (or separate barrier requests) and global read requests with block check sideband data are issued by the thread arbiter, the barrier status register and time stamp register are updated as described above and illustrated in FIG. 6. The requests are checked for global read requests with block check sideband data and for barriers at block 630 and 635. If a barrier is detected the barrier status register is updated at block 640. If a global read request with block check sideband data is detected, the barrier status register is cleared and the internal timestamp in the timestamp register is toggled at block 645.

The overall effect is that any request that follows an offending read will not be issued by the memory arbiter until all memory requests from all threads before it have been issued. GWAM contents can be erased for the threads that have barrier requests issued since the enforcement mechanism has ensured no future incoming request can overtake them.

Referring to the example sequence of FIG. 2a, when the T1_Read_to_C1 is presented to the detection module input, a match from the GWAM would cause the following actions by the detection module:

Insert a barrier request, T0_Bar_T1, to the other non-requesting thread T0. The barrier request has a sideband data of thread ID T1, indicating that it is a barrier request caused by a T1 global read.
Set block check values of T1_Read_to_C1 to 'wait until barrier from T0'.

Increment the Time-Stamp flag for future requests after the global cache read.

The memory arbiter decodes those order enforcement sideband values and takes the appropriate action:

Not stall barrier request T0_Bar_T1 and update the Barrier Issue Status Register when issued out to the memory bus.

Hold on to T1_Read_to_C1 until Barrier Issue Status Register indicates T0_Bar_T1 has been issued. The arbiter updates its own current time-stamp register after the T1_Read_to_C1 is issued. The issue of T0_Bar_T1 implies all requests prior to T1_Read_to_C1, including the offending write from T0, T0_Write_to_C1 has been issued.

For those 'safe' requests of TO_Write_to_C3 and T1_Read_to_C4 compare the arbiter current time-stamp register with the time-stamp values and only issue when the time-stamp values match.

Figure 7:
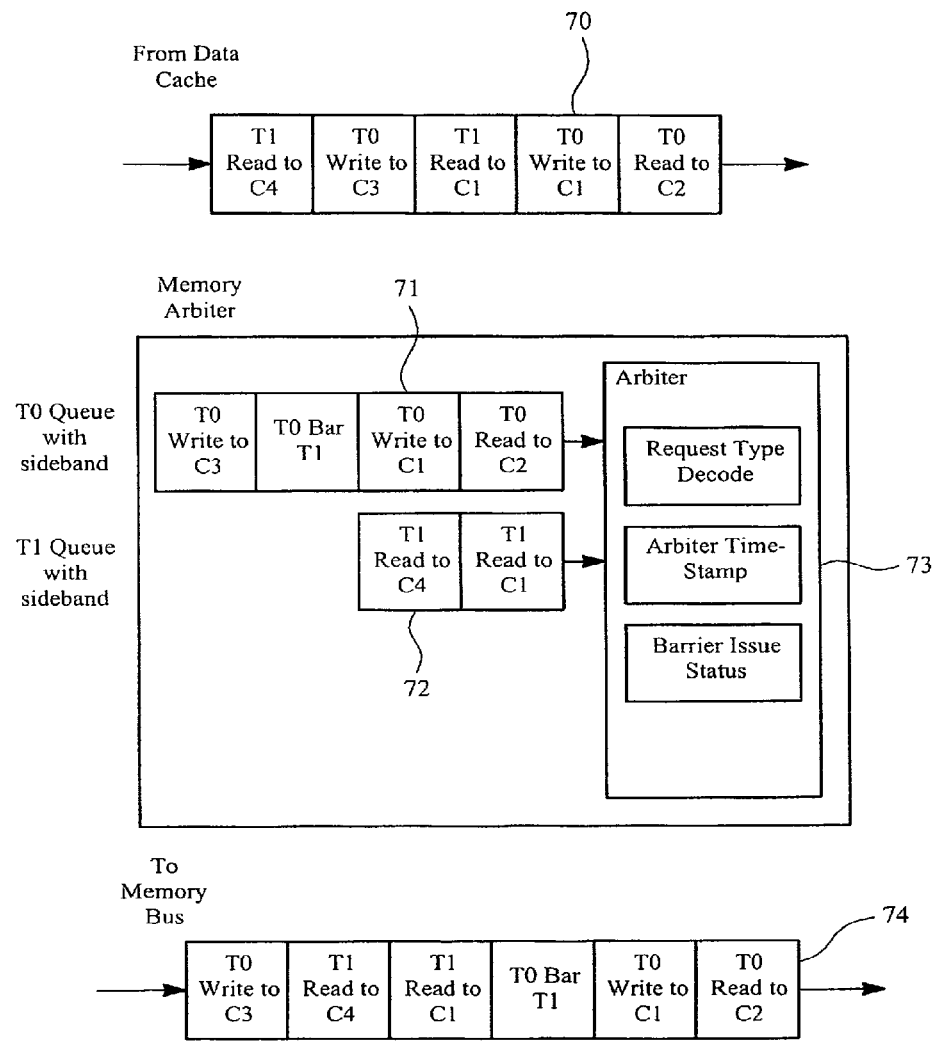
FIG. 7 illustrates order enforcement at the arbiter.

FIG. 7 illustrates such order enforcement process and outcomes by the memory arbiter. The initial stream of requests from the data cache is shown at the top of FIG. 7 as stream 70. The requests are separated into per thread streams and barriers and sideband data inserted by the incoherency detection module as described and shown in the centre of FIG. 7 entering thread arbiter 73 as streams 71 and 72. At the bottom of FIG. 7, the ordered stream of requests 74 sent to the memory bus is shown.

The incoherency hazard illustrated in FIG. 2b can be addressed using a different mechanism. The data cache contains a TAG RAM storing the physical addresses of the cache lines in the DATA RAM of the data cache. When the data cache receives a read request that misses in the data cache, an entry from the TAG RAM is chosen to store the physical address information of the cache line to be fetched by the read request. A filling flag can be added to this physical address information in the TAG RAM, which indicates that that portion of the RAM has been set aside for the cache line currently being fetched. The filling flag takes the value 1 when the cache line is being fetched and 0 when there is no cache line being fetched.

When there are subsequent writes from other threads to the same or different locations within the same cache line, while the filling flag has a value 1, another flag in the TAG RAM is set for that cache line, referred to as the "dirty flag". When the dirty flag has a value 1 it indicates that there is a potential incoherency hazard because one thread is modifying the cache line that is currently being fetched, and so there is no guarantee that the data eventually put in the data cache will be the most up-to-date data. When the dirty flag is 1, the cache line is considered invalid as its data cannot be trusted. In this case, subsequent read requests will ignore the data in the data cache and will fetch the up-to-date data from the main memory.

The following sequence illustrates this mechanism for the situation illustrated in FIG. 2b.

T1 reads B. Since B is not in the data cache, data cache MMU fetches the cache line containing B from the memory bus. A TAG field in the TAG RAM is updated and filling flag is set to 1 and dirty flag is set to 0.

T0 writes to A with data 0X10. Although A is not in the cache, filling flag in the RAM indicates that the cache line is currently being filled. The dirty flag is therefore set to 1.

T1 cache line fetch done. The cache line in the data cache contains the old value of A from the main memory, as a result of the read request.

T0 read A. Although the Tag RAM content indicates a cache hit, because the data cache contains cache line including A, the dirty flag is set to 1 for that cache line. The hardware then decides that this read misses in the cache, and the line is fetched again from the memory bus. Since this read occurs after the T0 write, the read returns the latest value of A and data coherency is maintained.

The combination of the two mechanisms, the first dealing with scenarios as illustrated by FIG. 2a and the second dealing with scenarios as illustrated by FIG. 2b, provides a solution to data incoherency occurring as a result of cache misses in write through data caches.

We claim:

1. A system capable of concurrently executing a plurality of threads, comprising:

a processor capable of concurrently executing a plurality of threads;

a memory storing data accessible by each of the plurality of threads, through a memory interface; and an incoherency detection module coupled with the processor and configured to maintain data for each outstanding global write memory transaction, detect a conflict between any of the outstanding global write memory transactions and a new read memory transaction, and responsive to detecting a conflict between a specific outstanding global write memory transaction and the new read memory transaction, to generate barrier data sequenced with respect to the specific global write memory transaction for which the conflict was detected, the barrier data comprising an identifier of the new read memory transaction, and wherein the memory interface is operable to prevent the new read memory transaction from being performed until the sequence of the specific global write memory transaction and the barrier have been processed by the memory interface.

2. The system capable of concurrently executing a plurality of threads of claim 1, further comprising a data cache comprising a tag RAM and the incoherency module is coupled between the data cache and the memory, and the data cache is responsive to a read request from the processor missing in the data cache to generate a read request to be serviced by the memory.

3. The system capable of concurrently executing a plurality of threads of claim 2, wherein the data cache is further configured to select an entry in the tag RAM in which to store the physical address information of the cache line to be fetched by the read request and set a filling flag for this physical address.

4. The system capable of concurrently executing a plurality of threads of claim 3, wherein the data cache is further configured to generate read requests to be serviced by the memory responsive to the filling flag being set for a cache line that was requested by a thread executing on the processor.

5. The system capable of concurrently executing a plurality of threads of claim 1, wherein the incoherency module is configured to store a plurality of addresses as a single address range entry, and to dynamically adjust the address range responsive to receiving another entry to be represented by the data stored in the single address range entry.

6. The system capable of concurrently executing a plurality of threads of claim 1, wherein the memory interface is configured to maintain data for each outstanding global write memory transaction in per-thread queues.

7. A method for controlling memory access in a processor capable of concurrently executing a plurality of threads, comprising:

maintaining respective per-thread data indicating memory address ranges in which one or more memory write transactions remain outstanding;

receiving a new memory read transaction to be completed for a specified memory address;

comparing the specified memory address with memory address ranges in the maintained respective per-thread data;

responsive to detecting an overlap between any of the memory address range and the specified memory address, associating a barrier with each overlapping memory address range, the barrier sequenced in a queue with respect to a conflicting memory transaction to require that the conflicting memory transaction be completed before the barrier is removed, and associating data with the new memory read transaction indicating the thread for which the barrier was created; and preventing the received new memory transaction from being processed until the barrier has been removed from the queue.

8. The method for controlling memory access in a processor capable of concurrently executing a plurality of threads of claim 7, wherein the new memory read transaction comprises a global read request and the preventing comprises repeatedly checking a barrier status register to determine whether a barrier remains to servicing the global read request and while a barrier remains, blocking the global read request.

9. The method for controlling memory access in a processor capable of concurrently executing a plurality of threads of claim 7, further comprising maintaining per-thread streams of requests.

10. The method for controlling memory access in a processor capable of concurrently executing a plurality of threads claim 7, wherein the preventing comprises checking a barrier status register.

11. An interface to a memory for use in a computation system capable of concurrently executing a plurality of threads, comprising:

an input configured to receive read requests and write requests, wherein the read requests comprise a global read request; and an arbiter configured for processing the read requests and the write requests to maintain coherency of data in the memory, the arbiter comprising a barrier status register, and configured to access check data associated with the global read request, which indicates barrier data associated with that global read request and to check the barrier status register to determine if all barriers associated with the global read request have been issued, and to stall the global read request until all barriers associated with the global read request have been issued.

12. The interface to a memory for use in a computation system capable of concurrently executing a plurality of threads of claim 11, wherein the arbiter is configured to release the global read request, in response to the determination that all barriers associated with the global read request have issued, to a thread arbiter configured for receiving the global read request from the arbiter, and to arbitrate among a plurality received global read requests for access to the interface for servicing each of the received global read requests.

13. The interface to a memory for use in a computation system capable of concurrently executing a plurality of threads of claim 12, wherein the arbiter further comprises a time stamp register that is incremented in response to the global read request being issued to the thread arbiter.

14. The interface to a memory for use in a computation system capable of concurrently executing a plurality of threads of claim 13, wherein the barrier status register is cleared in response to the time stamp register being incremented.

15. The interface to a memory for use in a computation system capable of concurrently executing a plurality of threads of claim 12, wherein the input is coupled to receive requests from a cache memory and the memory coupled to the interface is a main memory.

16. The interface to a memory for use in a computation system capable of concurrently executing a plurality of threads of claim 12, wherein the arbiter further comprises a time stamp register that is toggled in response to the global read request being issued to the thread arbiter.

17. The interface to a memory for use in a computation system capable of concurrently executing a plurality of threads of claim 11, wherein the arbiter is configured to stall any read requests received by the arbiter until the global read request has issued.

18. The interface to a memory for use in a computation system capable of concurrently executing a plurality of threads of claim 11, wherein the interface to the memory comprises a memory bus.

* * * * *